Dec. 31, 1968   R. ADLER   3,419,322
ULTRASONIC TRANSDUCER MATCHING FOR BRAGG REFLECTION SCANNING
Filed Aug. 3, 1965   Sheet 1 of 2

$$\theta = \frac{\pi}{2} - \frac{\Theta}{2}$$

INVENTOR.
Robert Adler
BY
Attorney

*INVENTOR.*
Robert Adler
BY

Attorney

United States Patent Office 3,419,322
Patented Dec. 31, 1968

3,419,322
ULTRASONIC TRANSDUCER MATCHING FOR BRAGG REFLECTION SCANNING
Robert Adler, Northfield, Ill., assignor to Zenith Radio Corporation, Chicago, Ill., a corporation of Delaware
Filed Aug. 3, 1965, Ser. No. 476,798
8 Claims. (Cl. 350—161)

ABSTRACT OF THE DISCLOSURE

Light-beam scanning angles obtainable from light-sound interaction are increased by introducing dispersion of the sound waves. In one general approach, the sound waves are passed through a fixed grating or otherwise through a medium which is dispersive by reason of its character. In another general approach, vibrational dispersion is obtained by launching a longitudinal wave in response to either a shear wave or an extensional wave.

---

The present invention has to do with signal translating apparatus. More particularly, it pertains to apparatus in which light and sound waves interact. As utilized herein, the terms "light" and "sound" denote only very generally that there are two different quanta of wave energy. For example, "light" includes wave energy at wavelengths both above and below as well as within the visible light spectrum, and "sound" refers not only to audible acoustic energy but also to waves at extremely short wavelengths, including microwave frequencies.

In my copending prior application Ser. No. 388,589, filed Aug. 10, 1964, and assigned to the same assignee as is the present invention, sound waves are propagated across a beam of light waves. The resulting interaction causes the light beam to be diffracted. Modulation of the sound waves can subsequently be detected or demodulated either in the form of intelligence in the modulation itself or the modulation can be utilized to cause the light beam to be deflected across a light-responsive surface.

To achieve optimum operation in the system of the afore-described character, it is desirable that the light and sound wave-fronts form a particular angle with one another; this is known as the Bragg relationship. Under the Bragg condition, when the light wave-fronts intersect the sound wave-fronts at the Bragg angle, the traveling sound wave-fronts act upon the light energy as if they were traveling mirrors; the angles of incidence and refraction of the light waves are equal. The Bragg angle is a function of the wavelengths of the light and sound. With planar light and sound wave-fronts, for a given angle there is but a limited range of tolerance over which the sound frequency may vary. In a beam scanning system, for example, this limits the extent of beam deflection available from a fixed interaction angle.

The aforesaid prior application recognizes these limitations and specifically embodies means for changing the physical relationships of the elements so as to change the angular orientation in correspondence with changes in frequency. In another of my copending applications, Ser. No. 476,873, filed Aug. 3, 1965 and also assigned to the same assignee, a similar overall system is disclosed in which at least one of the sound or light wave-fronts is purposefully permitted or caused to be curved. In that way, the elements may be initially positioned so that a tangent to the curved wave-front includes a tangent which intersects the light wave-fronts at the Bragg angle. The many available tangents afford a wide range of sound scanning frequencies or variation in sound frequency. However, with this approach only a portion of the available sound energy is utilized for obtaining diffraction of the light.

It is accordingly a general object of the present invention to provide a light-sound interaction system which improves upon the above-described prior systems.

Another object of the present invention is to provide a light-sound interaction system in which the correct angular orientation between the light and sound waves is automatically obtained throughout a range of sound frequencies.

Both in connection with light-sound interaction for the above-described and other purposes and in a host of other systems in which sound waves are coupled to and propagated through a given medium, difficulty exists in obtaining optimum coupling and efficiency of propagation. To the extent to which such optimum relationships do not exist, the entire system efficiency is lower than may be desired.

For example, in coupling a transducer, such as a piezoelectric device, to a medium of considerably lower acoustic impedance, such as water, it usually is difficult to obtain both a good efficiency of power transfer and a wide bandwidth. One approach has been to use a quarter-wave transformer; however, if only one such transformer is employed the bandwidth is severely limited. This particular limitation can be overcome by using two or more quarter-wave transformers in cascade. If two transformers are employed, they have impedances of $Z_w n^{1/4}$ and $Z_w n^{3/4}$, respectively, where $Z_w n$ and $Z_w$ are the two impedances between which the transformation is to be made. In practice, between a piezoelectric element and water, the impedance ratio $n$ has a value between 10 and 20. Thus, the value of $n^{1/2}$ (for a single quarter wave-section) is between 3 and 5, and $n^{1/4}$ and $n^{3/4}$ are about 2 and 8, respectively. The corresponding impedances of the transformers are 4.5 to 7.5 for $n^{1/2}$ and about 3 for $n^{1/4}$ and 12 for $n^{3/4}$, all expressed in terms of $10^6$ kilogram meter$^{-2}$ second$^{-1}$.

It is not easy to obtain practical materials for a single quarter-wave matching section; such materials have been synthesized by filling an epoxy with metal powder. The thicknesses involved often are of the order of 0.001 inch as a result of which the fabrication of such structures is at best difficult. Materials have been found to exist for double, cascaded quarter-wave-sections. However, such arrangements also are inconvenient because of the necessity of cementing together several precise layers of materials having widely different properties. In the usual operation, all of the layers, including the transducer, are extremely thin and flimsy. For example, piezoelectric half-wave transducers operative in the range of 60 megacycles are very fragile and difficult to obtain.

Accordingly, it is a further object of the present invention to provide new and improved signal propagating apparatus in which the efficiency of coupling and of propagation of sound waves is improved.

A related object of the present invention is to improve the impedance match between a sound transducer and a sound propagating medium.

In one form of the invention, signal translating apparatus includes means for producing a beam containing waves of spatially coherent substantially monochromatic light together with means for directing across the path of the light beam sound waves of variable frequency. Disposed in the sound path are means dispersive of the sound waves. The dispersive means vary the orientation of the sound wave-fronts relative to the light wave-fronts so that the sound wave-fronts intersect the light wave-fronts substantially at the Bragg angle, corresponding to the wavelengths of the light and sound waves, throughout a range of sound-wave frequencies.

In another aspect of the invention, sound propagating apparatus includes a first medium propagative of sound energy, in the form of shear waves or extensional waves, along a boundary thereof together with means for developing the sound energy. A second medium has a boundary in common with the first and is responsive to the waves in the first medium to propagate longitudinal waves.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements and in which:

Figure 1:
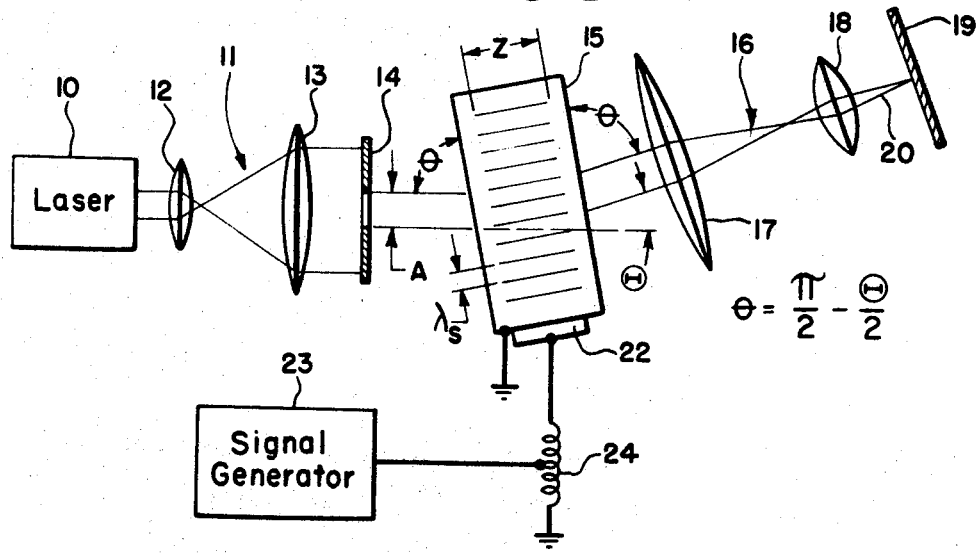
FIGURE 1 is an overall schematic diagram of a light-sound interaction system.

The system depicted in FIGURE 1 is basically the same as that described and claimed in application Ser. No. 388,589 and is included here to facilitate an easier understanding of the improvements disclosed by the present application. The apparatus includes a source 10 of spatially coherent substantially monochromatic light, magnifying telescope 11 having an eye-piece 12 and an object lens 13, a beam-limiting aperture-plate 14 with an aperture width A, a light-sound interaction cell 15, an inverted-telescope 16 having an object lens 17 and an eye-piece 18, and, in this illustration, a light-responsive screen 19 across which light beam 20 is caused by the apparatus to be scanned.

In one example, cell 15 is a container the walls of which are transmissive to the light waves and which is filled with water as the sound propagating medium. At one end of cell 15, coupled to the water, is a transducer 22 driven by electrical signals from a signal generator 23 suitably matched to transducer 22 by a transformer 24. As illustrated, transducer 22 develops planar wave-fronts.

With the apparatus of FIGURE 1, Bragg reflection is obtained when the light, of vacuum wavelength $\lambda$, travels in a stratified medium of spatial period $\Lambda$ between the stratifications and refractive coefficient $n$ through a path length $Z$ such that:

$$Z \gg n\Lambda^2/\lambda \quad (1)$$

The diffracted light forms a diffraction angle $\Theta$ with the undiffracted light, according to:

$$\sin \frac{\Theta}{2} = \frac{1}{2} \frac{\lambda}{\Lambda} \quad (2)$$

Where $\Theta$ is much less than 1, $\Theta \cong \lambda/\Lambda$. The Bragg angle may be defined in terms of the angle $\theta$ between the light and sound wave-fronts; in that case the function in Equation 2 is more directly expressed in terms of cosine rather than sine. Since $\theta$ is the complement $\pi/2 - \Theta/2$, the left-hand term in Equation 2 becomes $\cos \theta$. Angle $\theta$ also is the angle between the propagation directions of the diffracted light and the sound beams. To obtain optimum intensity, the strata must be oriented like mirrors, symmetrical to the incident and diffracted light. However, that precise orientation affects only the intensity, not the direction of the diffracted light.

When the strata are generated by a sound wave of phase velocity $v$, the wavelength $\Lambda$ for an applied frequency $f$ is $\Lambda = v/f$ and the diffraction angle $\Theta = \lambda f/v$. If the sound frequency is varied over a range $\Delta f$, the resulting scanning angle is $\Delta \Theta = \lambda (\Delta f)/v$.

The minimum angle which a projection system of aperture width A can resolve is $\Theta_{min} = \lambda/A$. Dividing the scanning angle $\Delta \Theta$ by this minimum angle, the number N of resolvable spots is found to be:

$$N = \Delta \Theta / \Theta_{min} = (\Delta f) A/v \quad (3)$$

A is the aperture width measured at approximately right angles to the sound wave-fronts, i.e., along the direction of sound travel. It will be seen that $A/v$ is the transit time T of the sound waves across the aperture. Thus:

$$N = (\Delta f) T \quad (4)$$

To afford a grasp of the parameters involved, it may be helpful to examine one successful embodiment of the FIGURE 1 system. The change of sound frequency $\Delta f$ is chosen to be $5 \times 10^6$ cycles-per-second and aperture width A is 22 millimeters. Since the sound velocity $v$ in water is $1.5 \times 10^6$ millimeters-per-second, the transit time is calculated as 14.7 microseconds and the number of resolvable points N in accordance with the foregoing relationship is calculated to be 73.5. The 1.5 millimeter wide beam from a helium-neon laser operating at 6328 A. is expanded to a width of about 30 millimeters by telescope 11 which has a magnification of 21. Aperture plate 14 allows a light beam width A of 22 millimeters as the light enters cell 15. Transducer 22 is a quartz crystal 15 millimeters wide (making path length Z equal to 15 millimeters) and 3 millimeters high.

At the selected average frequency of 42.5 megacycles per second, the diffraction angle $\Theta$ is 18 milliradians. Cell 15 is tilted by half this amount to obtain optimum Bragg reflection. Inserting the selected parameters ($n = 1.33$, $\Lambda = 3.53 \times 10^{-2}$ millimeters, $\lambda = 6.33 \times 10^{-4}$ millimeters) into the criteria set forth above, it is found that $n\Lambda^2/\lambda$ is equal to 2.65 millimeters; a light path Z of 15 millimeters is therefore of sufficient length to insure operation in the Bragg region. The electrical power applied to transducer 22 is 200 milliwatts; the transducer is matched to the output of signal generator 23 by transformer 24 which is tuned over the range from 40 to 45 megacycles-per-second. The incident light is restricted by the rectangular aperture to 3 millimeters in height, so that no light can bypass the sound wave. The intensity of the diffracted light entering inverted telescope 16 is 8 db below that of the undiffracted light entering cell 15.

On leaving cell 15 the diffracted light is projected through inverted telescope 16 which magnifies all angles 14.4 times. Consequently, the observed diffraction angle becomes $\Theta'$ which, according to calculation, is of a value of 260 milliradians. Similarly, the scanning angle $\Delta \Theta$, which without inverted telescope 16 is computed to be 2.11 milliradians corresponding to a frequency change $\Delta f$ of 5 megacycles per second, is increased to a value ($\Delta \Theta'$) of 30.4 milliradians. Also by virtue of the inclusion of inverted telescope 16, the minimum resolvable angle is increased from $\Theta_{min} = \lambda/A$ of 0.029 milliradian to a value of 0.415 milliradian. In that particular system, light responsive screen 19 is in the form of a film spaced a distance D of 1.5 meters from lens 18; the telescope is adjusted so as to focus the light on the screen. For that arrangement, the computations reveal a scanning pattern which occupies a space ($D \times \Delta \Theta'$) of 47.5 millimeters and the theoretical resolution is 0.65 millimeter.

To ascertain the actual resolution, the sound frequency $f$ is changed in equal steps as the film is exposed by the scanned light beam. The film upon development reveals a series of white lines. It is found that the white lines tend to merge when the spacing is reduced to about 71 steps each 70 kilocycles apart. The agreement with the calculated figure of resolution N of 73.5 is extremely good.

In the aforedescribed operation, lines, instead of dots, appear on the exposed film because the aperture at right angles to the direction of scanning, and corresponding to the height of transducer 22, is only 3 millimeters. This renders the vertical resolution almost one order of magnitude poorer than the horizontal. Where necessary, this difference in resolution may be eliminated by the use of cylindrical lenses in the projecting telescope 16.

The attenuation in water of sound in the 40 megacycle range is about 0.5 db/millimeter, or 11 db across the 22 millimeter aperture in the above-described example. When a light beam of uniform intensity and semi-infinite width traverses a sound wave of exponentially decreasing amplitude, the resolution of the diffracted light equals that which would be obtained with zero sound attenuation and a uniformly illuminated aperture $A_{eq}$; here $A_{eq}$ is the distance in which the sound power is attenuated by $2\pi$ nepers (27 db). In that apparatus, $A_{eq}$ is about 55 millimeters. Consequently, the resolution obtained is predominantly determined by the physical aperture. It should be noted that a beam with a gaussian intensity distribution suffers no loss of resolution. The effect of the exponential decay of sound amplitude across such a beam is merely that of displacing the center of the diffracted beam.

Theoretically, the sound cell in FIGURE 1 should be rotated by $\frac{1}{2}\Delta\theta$ ($\pm\frac{1}{4}\Delta\theta$) as the diffracted light is scanned over $\Delta\theta$. For the above results, this is not necessary; the tolerance on the cell position can be shown to be about $\pm\frac{1}{2}\Lambda/Z$, extinction occuring at $\pm\Lambda/Z$. The value of $\frac{1}{2}\Lambda/Z$ is about 1.2 milliradians while $\frac{1}{4}\Delta\theta$ is only 0.53 milliradian for $\Delta f=5$ megacycles per second. In the example described, $\Delta f$ is limited by transducer bandwidth.

With improved transducer design, it is possible to obtain much larger scanning angles. A value for $\Delta f$ of 15 megacycles per second, for instance, produces 220 resolvable spots with aperture width A unchanged. Such improvement, however, causes the scanning angle to exceed the above-mentioned tolerance range and thus forces a reduction in the length Z. This in turn calls for increased sound power to maintain the diffracted light at equal intensity.

To increase the aforesaid tolerance range and therefore to obtain a larger magnitude of beam deflection, other conditions remaining the same, means dispersive of the sound waves are disposed in the sound path. This causes variation of the orientation of the sound wave-fronts relative to the light wave-fronts in correspondence with changes in frequency of the sound waves. In consequence, the sound wave-fronts always intersect the light wave-fronts substantially at the Bragg angle $\theta$, corresponding to the wavelengths of light and sound waves, throughout a range of sound-wave frequencies. As embodied in FIGURE 2, the dispersive means take the form of a fixed acoustic diffraction grating disposed parallel to the wave-fronts produced by transducer 22. Grating 30 is disposed within cell 31 which, as in the case of cell 15, contains a sound propagating medium such as water. Sound waves are diffracted from grating 30 along a path which forms an angle $\phi$ with the normal to the grating.

With grating 30 having a grating constant $g$ in number of lines or strips per unit length, angle $\phi$ is determined in accordance with the relationship:

$$\sin \phi = \Lambda g = \frac{Vg}{f} \quad (5)$$

Expressed in terms of frequency, since $\Lambda=v/f$, Equation 2 becomes:

$$\sin \frac{\theta}{2} = \frac{1}{2}\frac{\lambda f}{v} \quad (6)$$

A comparison of Equations 5 and 6 reveals that $\sin \theta/2$ and $\sin \phi$ are inversely proportional. It is possible to achieve a match of their derivatives and hence a variation of diffraction in cell 31 corresponding to the needed variation in Bragg angle in the system over a finite range.

Figure 3:
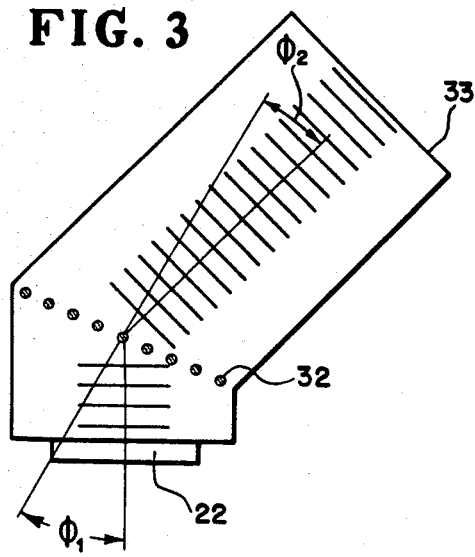
FIGURE 3 is a schematic diagram of an alternative to the element depicted in FIGURE 2.

The relationships revealed by these two equations are coordinated better by the apparatus of FIGURE 3 in which grating 32 in cell 33 has its normal tilted at an angle $\phi_1$ with respect to and normal to the incoming wave-fronts and the normal to the diffracted sound wave-fronts forms an angle $\phi_2$ with respect to the grating normal. A linear relationship exists between the quantities $f$ and $\sin \theta/2$ and, for small angles $\theta/2$, also between $f$ and $\theta/2$. Linear relationships should exist between the sound frequency $f$ and the angle $\phi_2$ over a wide range of sound frequency. In the arrangement of FIGURE 3, $$\sin \phi_1 + \sin \phi_2 = \Lambda g \quad (7)$$

Since $\sin \phi_1$ is a constant and can be chosen as large as desired, good linearity of $\phi_2$ with respect to $\Lambda$ can be obtained for a range of the value $\Lambda g$ centered around the conditions:

$$\Lambda_0 g = \sin \phi_1 \quad (8)$$

where $\phi_2$ is equal to 0. The angle $\phi_2$ can go either positive or negative in this relationship as the value $\Lambda g$ changes above and below the center value of $\Lambda_0 g$. To get the desired linearity with respect to sound frequency $f$ rather than sound wavelength $\Lambda$, the value of $\sin \phi_1$ may be chosen greater than the value of $\Lambda_0 g$, so that $\sin \phi_2$ is normally negative. This yields a correction of the desired kind.

Figure 2:
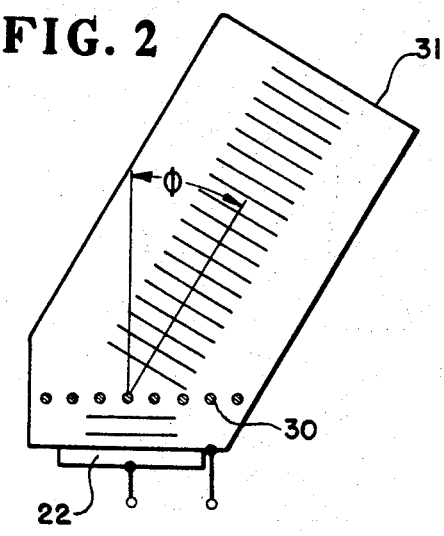
FIGURE 2 is a schematic diagram depicting one element in the system of FIGURE 1.
Figure 4:
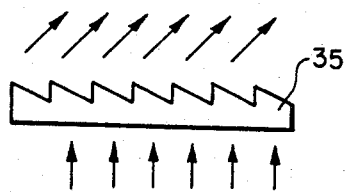
FIGURE 4 depicts another alternative to the element depicted in FIGURES 2 and 3.

With sound waves incident upon a grating as in FIGURE 2, the grating diffracts the waves into a series of sonic diffraction orders separated from one another by the angle $\Lambda/g$. Instead of using a wire mesh as illustrated, the grating "wires" may be shaped or a surface may be ruled and contoured with a cutting tool so as to diffract substantial sonic power into a single diffraction order. This is accomplished, for example, by ruling the grating as parallel sawtooth grooves in a plate of plastic, glass, metal, or other substance, as depicted in FIGURE 4 in which the outline of the overall cell is omitted for simplicity.

Figure 5:
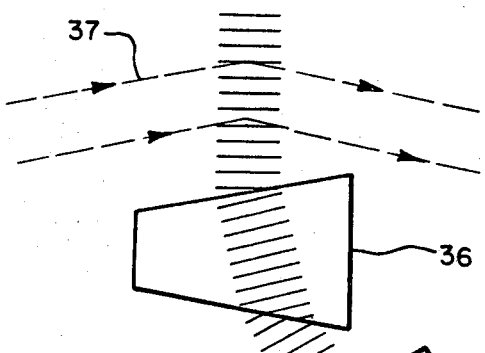
FIGURE 5 depicts a still further alternative to an element depicted in FIGURE 4.

In FIGURE 5, sound waves in transducer 22 are propagated through a dispersive element 36 from which they are directed across the path of a light beam 37. In this instance, element 36 is in the form of a prism disposed in the sound path. Element 36 is a homogeneous medium throughout which are distributed small resonators. While such resonators may be materials that occur naturally in the medium or may be suitable molecular or atomic resonances at the desired frequencies, and either liquid or solids may be utilized, they may also be elements added or created in forming a synthetic dispersion medium; in the latter case they may take the form either of small spheres or fibers. Such particles may be of any shape and even may be irregular provided that they are assigned suitable resonant frequencies and relaxation times. It will be apparent that the particles are selected to have dimensions relative to the velocity of sound so as to resonate near the operating sound frequency. The size and mechanical impedance of the particles is such as not to cause excessive scattering and the internal damping caused by the resonators is not so high as to substantially increase the loss in the material.

One such dispersive medium is formed by distributing quartz grains through cut glass while it is liquified. Adjustment of the concentration and particle size gives the desired degree of dispersion. The concentration of grains per unit volume of material may also be continuously varied from point to point. In such a medium, the sound waves are curved and the curvature is a function of frequency. It is no longer necessary to enter the dispersive region at any angle other than normal incidence.

In another approach, the inhomogeneous medium is made by stretching fibers, such as glass fibers, across the sound path. The spacing and diameter of the fibers is adjusted to give the desired dispersion from point to point in the medium.

In such dispersive composite materials there is no need to maintain constant distance between individual pairs of the resonators. A randomly spaced array of identical resonators is highly dispersive and has the advantage that the scattered waves do not interfere coherently to produce diffraction grating effects. The medium can be described as isotropic if the resonators are randomly spaced and oriented. An example of such an isotropic dispersive medium is a volume of water filled with air bubbles.

Thus far, attention has been directed to dispersion of the sound waves as a result of what might broadly be termed as diffraction phenomena; the dispersion results from the physical disposition of discrete, though perhaps minute, dispersive elements. FIGURES 6 through 9 depict arrangements implementing what might be termed vibrational dispersion. This approach takes advantage of the relationships which exist between coupled waves of different types and of different sound propagation velocities in different media. By introducing additional parameters in the determination of the final sound path angle, increased flexibility is afforded in the design of the system in which the ultimate direction of the sound energy varies with frequency in accordance with a desired prescribed relationship.

Of course, the direct application in accordance with the foregoing is the attainment of a final sound wave angle which varies in accordance with the sound frequency so as to enable the maintenance of a Bragg relationship, or any other desired relationship, in a light beam deflection system. However, the use of different media in which the sound is propagated also offers distinct flexibility with respect to impedance relationships. This permits optimization of efficiencies in a variety of transducer coupling systems. For example, it is known to propagate a sound wave in a piezoelectric material which also is semiconducting or is associated with a semi-conducting material in such a way that there is interaction between sound wave phenomena and electrical wave phenomena to achieve amplification of one wave by the abstraction of energy from another source. The concepts herein employed permit flexibility of selection of such parameters associated with the sound wave as direction of propagation, velocity of propagation, and the macthing of impedances.

Figure 6:
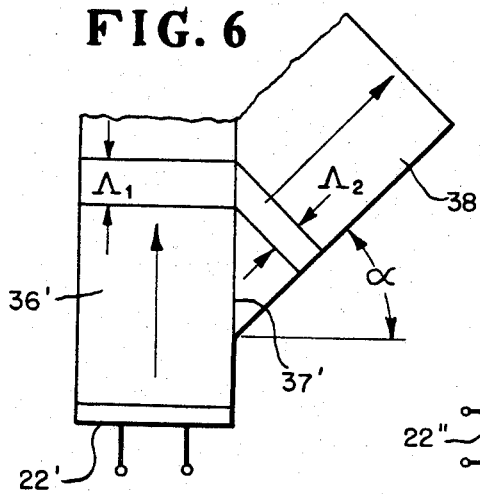
FIGURES 6 and 7 illustrate still further alternatives to the elements described in the earlier figures.

In the transducing system of FIGURE 6, a slab $36'$ of a first, heavier medium carries along the entire length of a boundary $37'$ a shear wave of sound energy at wavelength $\Lambda_1$ developed by transducer $22'$. As indicated, a longitudinal wave at wavelength $\Lambda_2$ is propagated from boundary $37'$ in a lighter medium 38. Boundary $37'$ is many wavelengths long at the sound frequency. In this arrangement, advantage is taken of the surface motion which accompanies a shear wave in order to generate the longitudinal wave in medium 38. The power transmitted from medium $36'$ to medium 38 is extracted from the shear wave; hence, for a slab as shown bounded by parallel surfaces the shear wave is attenuated exponentially. Eventually, all of the transmitted power is transferred to medium 38 which may be water as in the case of the previously discussed light-sound interaction cells.

It will be observed that the phenomenon is analogous to the action of a traveling-wave antenna. The longitudinal wave in medium 38 is propagated under an angle $\alpha$ with respect to the direction of propagation of the shear wave in medium $36'$ in accordance with the relationship:

$$\sin \alpha = \frac{v_2}{v_1} \quad (9)$$

where $v_1$ and $v_2$ are the propagation velocities respectively in media $36'$ and 38; $v_1$ is greater than $v_2$.

The exponential behavior mentioned above requires that the energy within the shear wave remains uniformly distributed. A certain fraction is transmitted to medium 38 per unit length. By reducing the cross section of medium $36'$ by that same fraction, as illustrated in FIGURE 7 wherein the width of medium $36'$ tapers toward a smaller dimension as the sound energy therein propagates forwardly, the energy density remains constant.

Figure 7:
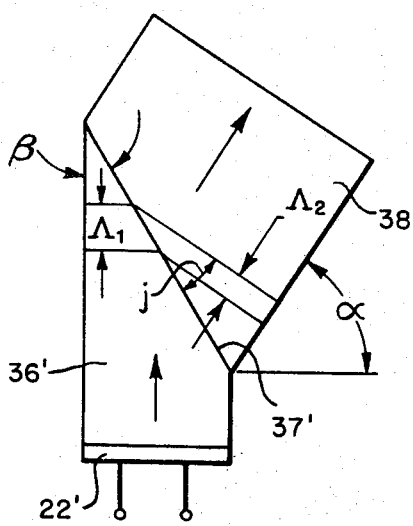

In operation of FIGURE 7, a plane wave in shear is converted into a plane longitudinal wave in medium 38. The condition stated by Equation 9 applies only when the wedge angle $\beta$ is zero; for FIGURE 7, $$\frac{\Lambda_1}{\cos \beta} = \frac{\Lambda_2}{\sin j} \quad (10)$$

or $$\frac{\sin j}{\cos \beta} = \frac{v_2}{v_1} \quad (11)$$

where $j$ is the angle between the wave-fronts in medium 38 and boundary $37'$. The wedge angle $\beta$, the angle of taper of medium $36'$, is preferably chosen for maximum power transmission; its value depends only upon the properties of the two media. In computing the wedge angle $\beta$, consideration is directed to the requirements of equal power flow in corresponding portions of boundary $37'$, and that corresponding amplitudes as computed with respect to either side of the boundary must exist at the boundary.

Medium $36'$ is described by a modulus of rigidity G and a density $\rho_1$. The phase velocity $v_1 = \sqrt{G/\rho_1}$. The impedance $Z_1 = \sqrt{G \rho_1}$. For an excursion $x_1$ along a wavefront at frequency $\omega$, the velocity is $\omega x_1$, the stress is $\omega x_1 Z_1$ and the power flow is $\omega^2 x_1^2 Z_1$, the latter two equations being in terms of a unit area.

In the medium 38, which may for example be water, the phase velocity is $v_2$ and the impedance is $Z_2$. These are determined by the density $\rho_2$ and the modules of elasticity E. For a liquid, the modulus of elasticity is the inverse of compressibility. The equations are:

$$v_2 = \sqrt{E/\rho_2}$$

and $$Z_2 = \sqrt{E \rho} \quad (12)$$

The requirements specified above and the foregoing material parameters result in the expressions:

$$x_1^2 Z_1 \sin \beta = x_2^2 Z_2 \cos j \quad (13)$$

and $$x_2 = x_1 \cos (\beta + j) \quad (14)$$

For the approximate solution where $\beta \ll 1$, the propagation angle $j$ is selected to satisfy the relationship:

$$\sin j = \frac{v_2}{v_1} \quad (15)$$

and the wedge angle $\beta$ is chosen to satisfy the expression:

$$\beta = \frac{Z_1}{Z_2} \cos^3 j \quad (16)$$

In a typical example, the wedge angle, $\beta$ is 0.039 radians or $2°14'$. With this value, for every wavelength width (transverse to direction of sound travel) in medium $36'$ there are 25 wavelengths of aperture width, using water for medium 38 and a solid with a propagation velocity of 3 kilometers per second for shear waves for medium $36'$. As known from standard reference works, aluminum is such a solid; this velocity for aluminum is given, for example, at pp. 3–80, chapter 3F by W. P. Mason, American Institute of Physics Hand Book, McGraw-Hill & Company, 1957, Medium 38 has an effective width of $$25 \frac{v_1}{v_2} \cos j$$

which, in this example, is 41 wavelengths in the water. In terms of length dimensions, one centimeter of aperture width in the water requires 1.16 centimeters of exposed boundary surface along medium 36'; this corresponds to 0.046 centimeter width.

Figure 8:
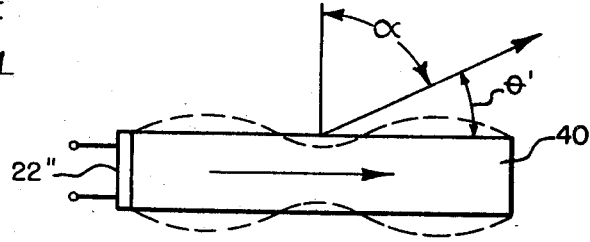
FIGURE 8 represents still another alternative form of such an element.
Figure 9:
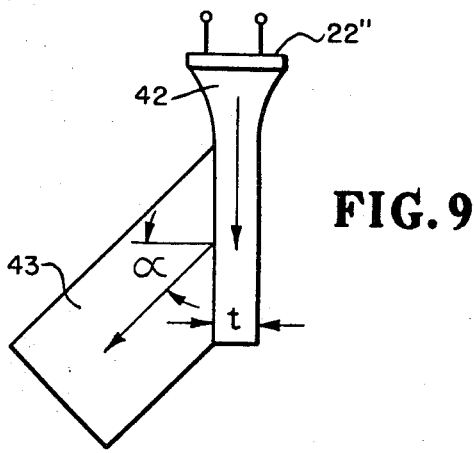
FIGURE 9 represents a modified form of the element depicted in FIGURE 8.
Figure 9:
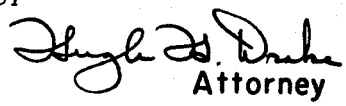

The embodiments of FIGURES 8 and 9 illustrate an approach utilizing the development of extensional waves in the first medium by transducer 22''. An extensional wave is basically a longitudinal wave having a component of transverse expansion and contraction. In FIGURE 8, material 40 is physically coupled to transducer 22'' and has a thickness, transverse to the direction of sound propagation, which preferably is near that which would correspond to ½ wavelength of a longitudinal wave in the material, or an integral multitude thereof. In this thickness range and below, transverse motion accompanies the primary longitudinal wave developed by transducer 22''. This transverse motion radiates sound energy into the adjacent medium, which as in the above example may be water. As the sound is so coupled to the adjacent medium, the sound energy is gradually dissipated or attenuated exponentially in medium 40.

The simplest analysis of extensional wave action is for the condition where the thickness is much much less than a wave length $\Lambda$ of the sound in the material, so as to exclude resonant effects. As in the case of shear waves, there is a particle motion $x_1$ which is related to the longitudinal excursion $x_0$ through the Poisson coefficient. For the longitudinal excursion $x_0$, the strain $s_0$ is equal to $$x_0 \frac{2\pi}{\lambda_0} \quad (17)$$

the lateral strain $s_1 = Ps_0$, where P is the Poisson coefficient. Assuming that the center line remains without lateral motion, $x_1 = \frac{1}{2}s_1 t$, where $t$ is the lateral thickness. Consequently, $$x_1 = -x_0 \frac{\pi t P}{\Lambda} \quad (18)$$

As in the previous analysis, $$\frac{x_2}{x_1} = \sin \alpha \quad (19)$$

Angle $\alpha$ is the same as in FIGURE 6.

It will be observed that this method of creating a sound beam whose ultimate direction is a function of its frequency employs a mode of dispersion that occurs in the vibration of the propagating body. The approach is applicable to the use of the transverse vibrations of a solid plate, such as medium 40 in FIGURE 8, the transverse vibrations of a periodically-loaded membrane, or surface waves which are the transverse vibrations of the interface between two different media. Such vibrations couple to pressure waves in the two media that contact the surface which is vibrating. The wave which is uitimately created, or radiated, from the vibrating surface has the same frequency and the same projected velocity along the direction of propagation of the surface wave. The actual velocity of the radiated ultimate wave will be characteristic of the medium so that its angle of propagation $\theta'$ with respect to the surface wave will be in accordance with the relationship (complemental to Equation 9):

$$\theta' = \cos^{-1} v_p/v_s \quad (20)$$

where $v_p$ is the velocity of a plane wave in the first medium and $v_s$ is the velocity of the transverse surface wave. Additionally, there are subsidiary radiation lobes corresponding to forward and backward radiated waves.

For the sound frequency ranges particularly discussed herein, and utilizing a typical material such as PZT (lead-zirconate-titanate), the required thickness of the first mediums for suitable operation is quite thin. In many applications, a material such as steel is more practical and less critical. Another alternative which affords greater flexibility in the choice of materials is illustrated in FIGURE 9. In this instance, transducer 22'' is coupled to the large end of a strip of first material 42 which, in the direction away from transducer 22'' tapers exponentially inwardly so as to decrease its transverse thickness $t$ by a substantial amount. The thickness $t$ preferably is of a value close to that corresponding to ½ wavelength, or an integral multiple thereof, of the sound frequency in the material. This approach yields substantial dispersion of the extensional-wave velocity. Since the direction of the sound radiated or propagated into the adjacent medium 43 is directly related to the propagation velocity in the first medium by the relationship of Equation 9 or 19, there is directly afforded a most suitable means of varying the direction of the ultimately radiated sound wave in correspondence with the variation in the frequency thereof.

It should be noted that in connection with all of the above alternative embodiments, advantageous flexibility of design often results when the initial or first medium has a narrow or small transverse dimension in both directions. That is, it advantageously may be in the form of a wire. The discussion with respect to both shear waves and extensional waves assumed plane surfaces. This restriction is by no means necessary. The wave-carrying surfaces well may be curved along one or both axes to achieve focusing with respect to a line or a point.

The description has included a number of different means for dispersing sound waves propagating in a medium. Such dispersion is highly advantageous in a system in which sound waves are projected across the path of a light beam at a critical angle in order to cause deflection of the light waves. Also, the techniques herein disclosed have utility in connection with the coupling of propagating sound waves between two different mediums and in achieving an increase in the transducing efficiency of a system.

While particular embodiments of the present invention have been shown and described, it will be obvious to those skilled in the art that changes and modifications may be made without departing from the invention in its broader aspects. Accordingly, the aim in the appended claims is to cover all such changes and modifications as fall within the true spirit and scope of the invention.

I claim:
1. Signal translating apparatus comprising:
   means for producing a beam containing waves of spatially coherent substantially monochromatic light;
   means for directing across the path of said beam sound waves of variable frequency;
   and means dispersive of said sound waves disposed in the path thereof and which vary the orientation of the sound wave-fronts relative to the light wave-fronts in correspondence with changes in the frequency of said sound waves so that said sound wave-fronts intersect said light wave-fronts substantially at the Bragg angle, corresponding to the wavelengths of said light and sound waves, throughout a range of sound-wave frequencies.

2. Apparatus as defined in claim 1 which includes means for repetitively scanning the frequency of said sound through a selected range of frequencies.

3. Apparatus as defined in claim 1 in which said dispersion means comprises a grating diffractive of said sound waves.

4. Apparatus as defined in claim 3 in which the direction of incidence of said sound waves upon said grating is normal thereto and the angle $\phi$ of diffraction of said sound waves relative to said normal is in accordance with the relationship:

$$\sin \phi = \frac{vg}{f}$$

where $v$ is the velocity of said sound waves, $f$ is the frequency of said sound waves, and $g$ is the grating constant in terms of number of lines per unit length.

5. Apparatus as defined in claim 3 wherein said sound waves are incident upon said grating at an angle $\phi_1$ relative to the normal to said grating, said sound waves are diffracted by said grating at an angle $\phi_2$ relative to said normal with the grating constant $g$, in terms of number of lines per unit length, selected in accordance with the relationship:

$$\sin \phi_1 + \sin \phi_2 = \Lambda g$$

where $\Lambda$ is the wavelength of said sound waves.

6. Apparatus as defined in claim 5 wherein $$\sin \phi_1 \approx \Lambda_0 g$$

where $\Lambda_0$ is the wavelength of said sound waves at the center of said range of sound wave frequencies.

7. Apparatus as defined in claim 1 in which said dispersion means is a medium transmissive of said sound waves and dispersed homogeneously throughout which are inclusions resonant to said sound waves at a frequency at least in the vicinity of the sound-wave frequency.

8. Apparatus as defined in claim 1 wherein said dispersive means comprises an element in which said sound waves excite vibrations of a surface thereof and create acoustic waves in an adjacent medium, said acoustic waves having a frequency the same as that of the sound waves and having the same projected velocity along said surface as the velocity of said vibrations therealong, the angle of propagation $\theta'$ of said acoustic waves relative to said surface being represented by $$\theta' = \cos^{-1} \frac{v_p}{v_s}$$

where $v_p$ is the velocity of an acoustic wave in said medium at said frequency and $v_s$ is the velocity of propagation of said vibrations along said surface, said surface being oriented relative to said beam path and said angle $\theta'$ being of a value such that the acoustic wave-fronts intersect said light wave-fronts substantially at said Bragg angle.

No references cited.

ROY LAKE, *Primary Examiner.*

DARWIN R. HOSTETTER, *Assistant Examiner.*

U.S. Cl. X.R.

332—7.51; 333—30; 340—15